United States Patent [19]

Mairlot

[11] 4,236,907

[45] Dec. 2, 1980

[54] METHOD FOR BENDING GLASS SHEETS AND APPARATUS THEREFOR

[75] Inventor: Henri Mairlot, Chatelet, Belgium

[73] Assignee: Saint-Gobain Industries, Aubervilliers, France

[21] Appl. No.: 28,175

[22] Filed: Apr. 9, 1979

[30] Foreign Application Priority Data

Apr. 7, 1978 [FR] France .................. 78 11165

[51] Int. Cl.³ .................................. C03B 23/025
[52] U.S. Cl. .................................. 65/104; 65/106; 65/245; 65/268; 65/273
[58] Field of Search ............... 65/108, 106, 107, 245, 65/273, 275, 268

[56] References Cited

U.S. PATENT DOCUMENTS 3,801,298  4/1974  Bezombes ........................ 65/104
3,831,239  8/1974  Hoff et al. ........................ 65/106 X
4,054,437  10/1977  Ueberwolf et al. ............... 65/104 X Primary Examiner—Arthur D. Kellogg
Attorney, Agent, or Firm—Pennie & Edmonds

[57] ABSTRACT

An energy saving method for the bending of glass sheets is disclosed. A sheet of glass is heated in an oven, conveyed to a curving form which includes a plurality of arched rods for imparting a desired curvature to the glass sheet, and finally the curved glass is tempered. The glass is heated in the oven to a first temperature that is only about 10° C. greater than the required temperature of the glass at the commencement of the tempering step. Heat loss from the glass between the steps of heating and tempering is minimized by the disclosed apparatus which comprises a thermally insulating enclosure as well as means for cooling the rods.

20 Claims, 5 Drawing Figures

METHOD FOR BENDING GLASS SHEETS AND APPARATUS THEREFOR

TECHNICAL FIELD

This invention relates to the curving and tempering of sheets of glass in a horizontal position. In particular, glass is heated in an oven to a temperature which is at least equal to its softening temperature and is advanced into a curving section where it is curved on a curving mold. Thereafter, the curved glass enters a tempering section where it is abruptly cooled.

BACKGROUND ART

As is known in the art, glass sheets may be curved by a curving mold comprising a series of curved or arched steel rods which extend parallel to each other transversely of the direction of glass travel. Typically, these rods are rotatable in unison about an axis passing through their two ends and their inclination determines the radius of curvature imparted to the glass sheet. Each curved rod is surrounded by a tubular sleeve made of stainless steel which possesses substantial torsional strength but is flexible in the axial direction. The sleeve is rotatably mounted on the curved rod and fixed at one end to a pinion so as to permit rotation regardless of the inclined position of the curved rod.

To minimize friction, the inside diameter of the tubular sleeves is made larger than the diameter of the curved rods and the sleeves are supported on graphite bearing rings disposed at spaced intervals along the length of each curved rod. Each ring is capable of rotating about the rod. Such an arrangement is disclosed in U.S. Pat. No. 3,831,239 to Hoff et al.

In such prior art devices, the curved rods of the curving section are situated in the open air. In this way the curved rods and the rings are air cooled and their temperature remains relatively low.

For ordinary glass the temperature at the inlet of the tempering section should be on the order of 600° to 650° C., and it should generally not be less than 610° C. Since the glass temperature drops about 70° C. during such a curving operation in the open air, the glass must be heated in the oven an additional 70° C. to a temperature between 670° and 720° C., depending on the type of glass. This elevated temperature results in certain disadvantages. For example, defects in the glass become evident, particularly the undulations whose pitch depends on the geometry of the roller bed which conveys the glass to the oven. Another obvious drawback is the large energy consumption required to attain the elevated temperature.

DISCLOSURE OF THE INVENTION

Applicant has discovered a method and apparatus for bending glass sheets which overcomes these disadvantages by lowering the maximum temperature to which the glass is heated, and thereafter limiting the heat losses incurred during curving. To practice the invention there is provided a curving bed comprising a plurality of curved rods each surrounded by a rotatable sleeve. Curving takes place in a closed chamber which may be heated so as to maintain a temperature that is at least equal to the glass temperature required at the start of the tempering step, i.e. at least 600° C. Unfortunately, the curved rods and the rings are also brought to this high temperature, with the result that the steel of the rods exhibits a very rapid flow, making the curving mold unusable after a few hours. Also, the graphite rings oxidize very rapidly.

To overcome these new drawbacks which result from the fact that the curving section is closed and possibly heated, in the present invention the curved rods include an axial bore, within which is circulated a heat-transfer fluid capable of lowering the temperature inside the rods to below 250° to 300° C., the threshold above which the part of the graphite rings in contact with the rods would begin to be oxidized by the air. This portion of the rings is its most vulnerable portion since it is subject to wear by both friction and ozidation.

In a preferred embodiment, the method for bending of sheets of glass is of the type which includes heating a glass sheet, conveying the heated glass sheet to a plurality of curved rods, imparting a predetermined curvature to the glass sheet, and tempering the curved glass sheet. The improvement wherein the glass sheet is heated in an oven prior to imparting a curvature thereto to a first temperature slightly greater than the temperature necessary for commencing the tempering step and generally maintaining the glass sheet at said first temperature until the tempering step is commenced.

In a preferred embodiment, the glass bending apparatus is of the type having a plurality of curved rods having a centrally arched portion each pivotable about an axis passing through its two ends to provide an envelope of a predetermined curvature for imparting a curvature to a sheet of heated glass being advanced thereover, a rotatable tubular sleeve disposed about each rod, and a plurality of graphite bearing rings disposed at spaced locations between each rod and sleeve for supporting each of the rotatable tubular sleeves about one of the curved rods. The improvement comprises means for injecting a fluid through the rods at a temperature substantially below the temperature of the heated glass, so that the graphite bearing rings are maintained in a substantially non-oxidizing environment.

According to a preferred embodiment of the present invention the curved rods are made of stainless steel and the curved rods are hollow tubes perforated at intervals, particularly at their central portion into which a reducing or inert gas is injected. This gas may be nitrogen or a mixture of nitrogen and hydrogen.

Advantageously, in order to prevent oxidation of the graphite rings situated at the ends of the curved rods, the ends are arranged outside the high-temperature curving chamber.

BEST MODE FOR CARRYING OUT THE INVENTION

Figure 1:
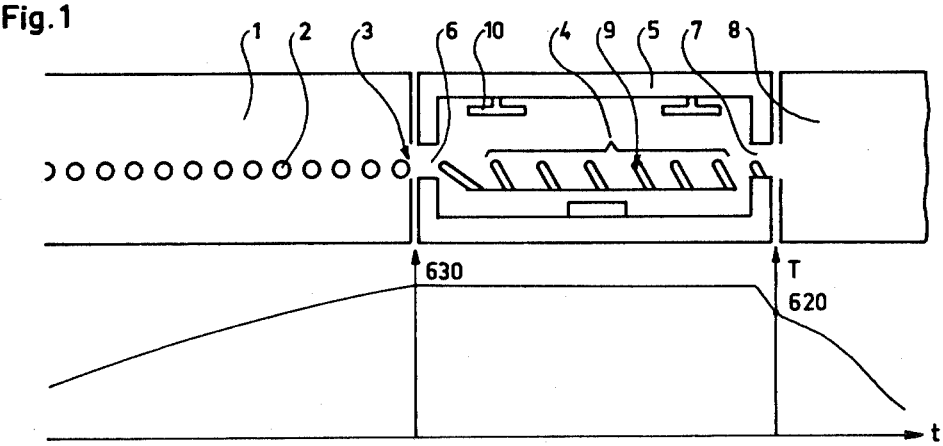
FIG. 1 shows diagrammatically a heating, curving and tempering apparatus according to the invention, with the temperatures in the different parts of the apparatus indicated in the accompanying diagram.

FIG. 1 shows a glass heating, curving and tempering apparatus. The apparatus comprises an oven 1 for heating glass sheets being horizontally conveyed therethrough. The oven 1 includes a plurality of conveying rollers 2 used for supporting and transporting the sheets of glass to its exit end 3. The apparatus further comprises a curving section which includes a curving mold or form 4, described in greater detail below, arranged inside a thermally insulated chamber 5 which is provided with two openings. Namely, a frontal opening 6 to permit entry of the sheets of glass, and a rear opening 7 for the exit of the sheets of glass after they have been curved. The apparatus also comprises a tempering section 8. The curving form includes, for example, a plurality of rotatable arched or curved rods 9 whose inclination determines the radius of curvature of the glass sheet.

The form 4 may be a fixed curving bed in which all the rods have the same maximum inclination corresponding to the desired curvature. In this case the sheets of glass are conveyed directly from the rollers 2 of the oven to the inclined curved rods 9. Alternately, the form 4 may also be a progressive curving bed with a first series of fixed rods exhibiting a progressively increasing inclination until a maximum inclination is attained which defines the curvature, and a second series of rods which are also fixed, all of which have this maximum inclination. Furthermore, the form 4 may be a movable bed comprising rods which lie in a horizontal position when at rest and which are all inclined the same angle relative to the horizontal whenever a sheet of glass is to be curved. The chamber 5 of the curving section may be provided with heaters 10 as well as a temperature regulating device (not shown).

Due to the thermal insulation of the curving section, the heat loss of the glass during curving is greatly diminished and may even be eliminated when heating elements 10 are installed and a temperature regulating device is provided. Thus, as shown in the diagram in the lower part of FIG. 1, a glass whose temperature at the start of tempering must be 620° C. need only be heated in the oven 1 to a temperature that is only slightly above 620° C. When heated in the oven to 630°, the glass will be conveyed at this temperature to the curving form 4 where it will take on the desired curvature. The glass will be maintained at this temperature during the curving operation, except possibly in the vicinity of the rear opening 7 of the chamber 5, where it will be affected to a slight extent by the blowing of the adjacent tempering section 8 and may therefore exhibit a temperature drop of about 10 degrees Celsius. The sheet of glass will then enter the tempering section 8 at about 620° C.

In a preferred embodiment of the present invention the curving form 4 may begin at, or even be situated entirely within, the glass heating oven 1.

Figure 2:
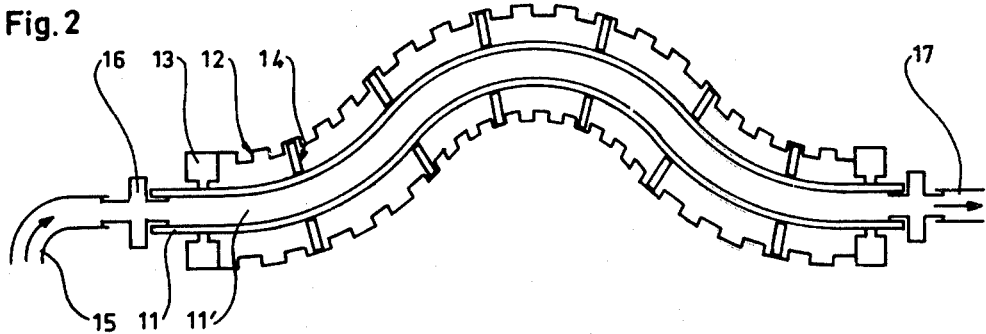
FIG. 2 is a schematic illustration of a section of a curved rod having a central bore therethrough and a tubular sleeve thereabout.
Figure 3:
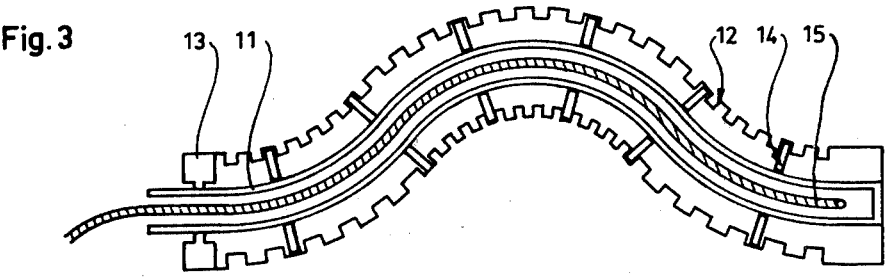
FIG. 3 is a modification of the embodiment illustrated in FIG. 2.

As shown in FIGS. 2 and 3 the curving members of the curving form 4 are curved rods 11 surrounded by a tubular sleeve 12 which is rotatably driven about rods 11 by a pinion fixed to one of their ends and rotatably mounted on the curved rods. To minimize friction, the diameter of the sleeves 12 is larger than the diameter of the rods 11, and the sleeves are supported at predetermined intervals by graphite bearing rings 14.

In the preferred embodiment illustrated in FIG. 2, the curved rod 11 includes an axial bore 11'. A heat transfer fluid is introduced into bore 11' through a pipe 15 which is connected to one end of each rod by a rotary coupling 16. Connected to the other end of the rod 11 is an exhaust pipe 17 which collects the fluid which has circulated in rod 11.

According to another preferred embodiment as illustrated in FIG. 3, the exit end of rod 11 is plugged and the pipe 15 through which the fluid is fed extends into the interior of the rod to the vicinity of the plugged end. The fluid injected through this pipe 15 circulates inside the bore 11' and returns to the inlet end from where it is removed. The cooling fluid used may be water. The rate of flow of the cooling water is controlled to avoid its boiling inside the rod and to ensure that its temperature as it is being removed is around 80° C. Other liquids whose boiling point does not exceed the range of 250° C. to 300° C., such as oils or molten salts, are also suitable. A gas may also be used, but its efficacy is not as great. As a result of this cooling the rods and the graphite rings—particularly their central portion which is in contact with the rods and which is therefore subject to wear by both friction and oxidation—are maintained at a relatively low temperature, below that at which oxidation would begin.

Figure 4:
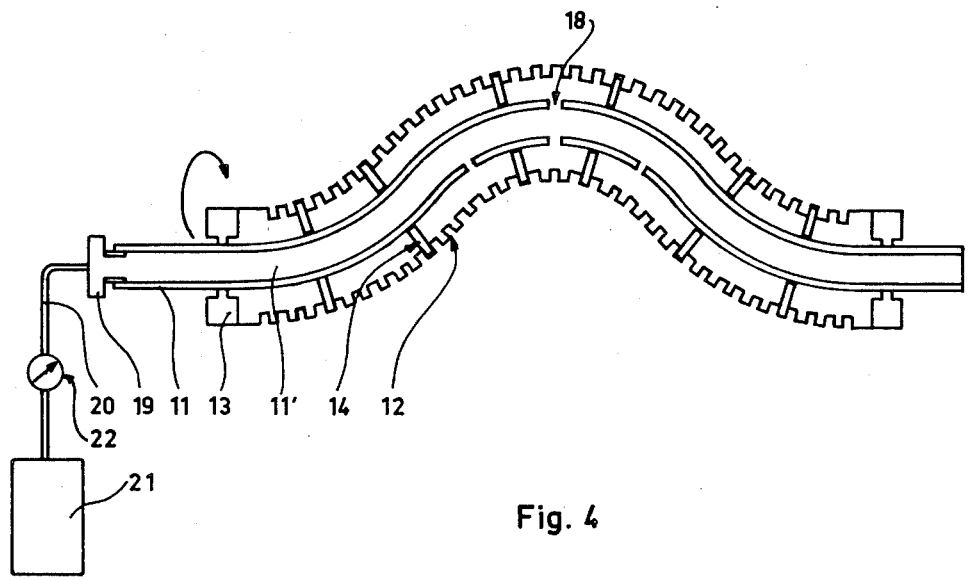
FIG. 4 shows a curved rod, as in FIG. 2, modified for the circulation of a gas therethrough.

According to another preferred embodiment as shown in FIG. 4, excessive cooling of the glass is avoided as it moves over a relatively cold curving form. In this embodiment, the rods are not cooled, but placed in an inert or reducing atmosphere so as to prevent oxidation of the graphite rings.

As shown in FIG. 4, the curved rods 11 are provided with the bore 11'. In this embodiment bore 11' is provided with at least one orifice 18 which opens onto the space between the rotating sleeve 12 and the rod 11. The injection of a reducing or inert gas may be effected through one end of the rods 11, with the other end being plugged. Alternately, injection of the gas may be effected through both ends. The end through which the gas is injected is then connected, by means of a rotary coupling 19, to a pipe 20 which in turn is connected to a gas source 21. A flow meter 22 may be installed in each tube 20 in order to regulate the rate of flow of gas in each rod 11.

The gas utilized is preferably nitrogen or a mixture of nitrogen and hydrogen. When industrial nitrogen is used, the oxidation is not completely suppressed, and traces of oxidation appear since the quality of this nitrogen is not constant. Accordingly, it is preferable to use nitrogen of 99.9997% purity, called "dry nitrogen". Nitrogen of such purity is substantially what is obtained by evaporation of liquid nitrogen.

The rate of flow of gas may be adjusted as a function of the observed oxidation of the rings. Tests carried out at a flow rate of 40 liters per hour, per curved rod, at standard temperature and pressure have given fully satisfactory results.

Figure 5:
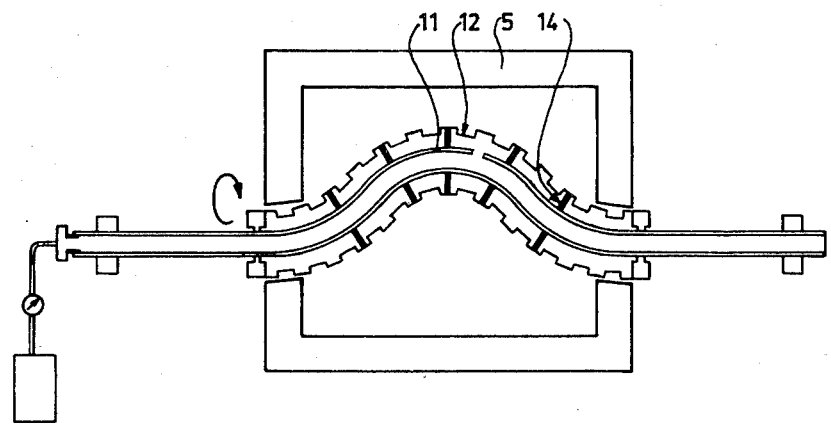
FIG. 5 is a schematic sectional illustration, similar to FIG. 4, showing an enclosure about a portion of the rod.

According to the embodiment shown in FIG. 5, oxidation of the bearing rings 13 located at the end of the rods, caused by entering air is avoided. The rod ends, rings 14, and the parts of the sleeves 12 associated therewith, are placed outside chamber 5. This arrangement is a limitation on the curving section. As a result, there will be a colder zone at each rod end. This colder zone serves as a lock chamber. The oxidizing air penetrates into this zone despite nitrogen and hydrogen circulation, but does not give rise to any adverse effect, because the rings at the rod ends which are not entirely in an inert or reducing atmosphere will not be subjected to the high temperatures at which they would undergo rapid oxidation.

Due to the circulation of a non-oxidizing gas, the outside temperature of the curving form may remain high and attain a temperature as high as 600° C. without causing the graphite rings to deteriorate from oxidation. Although the gas circulation does provide a certain cooling, this effect is slight when the flow rate remains on the order of 40 liters per hour. Hence the temperature remains high and the standard steel used for the rods 11 exhibits rapid flow.

To avoid this it is advantageous to use stainless steel. Satisfactory results have been obtained with a stainless steel of AISI quality 316 L (or Z 3 CND 18 12 according to the AFNOR standard) which has the following percent by weight analysis: Carbon: not more than 0.03; chromium 17; nickel 11; molybdenum 2.2; and a coefficient of thermal expansion at 100° C.: $16 \times 10^{-6}$; at 600° C.: $18.5 \times 10^{-6}$.

To avoid the necessity of the use of stainless steel, circulation of a gas in the rods may be combined with cooling with a heat-transfer fluid. A pipe 15 through which the fluid is fed is connected to each rod as shown in FIGS. 2 and 3. In addition, a gas tight inlet tube penetrates into the interior of said rods and connects to orifice 18, as shown in FIG. 4, which opens onto the space between the rods and their sleeves. The orifice 18 is preferably arranged in the central part of the rod. Thus, while the use of curved rods made of stainless steel is always possible, it is no longer indispensable, since the rods are maintained at a temperature sufficiently low so they do not flow. At this low temperature the central parts of the graphite rings, which are the parts most exposed to wear, are no longer oxidized, and their more peripherally situated parts, although exhibiting a slightly higher temperature, are likewise devoid of the risk of oxidation, since they are placed in a non-oxidizing atmosphere.

In this manner the glass is curved at a temperature below that at which it was curved when the curving operation preceding the tempering was carried out in the open air.

The time of curving for a given glass thickness and sag increases with decreasing temperatures, hence the curving form should be extended, or the rate at which the sheets of glass are fed to the curving section should be decreased.

Circulating an inert or reducing gas in the rods and the use of stainless steels, or the cooling of the rods with a heat-transfer fluid, or the cooling of the rods combined with circulation with a non-oxidizing gas, are indispensable measures when the curving section is enclosed. However, these same measures are of advantage when the curving section is in the open air, because they make it possible to reduce the deformations of the curving bed and thereby improve the optical quality of the glass. Moreover, the same measure may be used with rods situated in the tempering section.

I claim:

1. An improved method for bending of sheets of glass of the type which includes heating a glass sheet, advancing the heated glass sheet to a plurality of curved rods, imparting a predetermined curvature to the glass sheet, and tempering the curved glass sheet, the improvement wherein:
   (a) the glass sheet is heated in an oven prior to imparting a curvature thereto to a first temperature range slightly greater than the temperature necessary for commencing the tempering step; and
   (b) generally maintaining the glass sheet in said first temperature range while imparting said predetermined curvature thereto and until the tempering step is commenced.

2. An improved method for bending of sheets of glass of the type which includes heating a glass sheet, advancing the heated glass sheet to a plurality of curved rods, imparting a predetermined curvature to the glass sheet, and tempering the curved glass sheet, the improvement wherein:
   (a) the glass sheet is heated in an oven prior to imparting a curvature thereto to a first temperature slightly greater than the temperature necessary for commencing the tempering step;
   (b) generally maintaining the glass sheet at said first temperature until the tempering step is commenced; and
   (c) circulating a fluid inside each of said rods to maintain said rods below a second temperature which is substantially lower than said first temperature.

3. The method according to claim 2 wherein:
   (a) said second temperature is 300° C.; and
   (b) said fluid is a cooling liquid having a boiling point less than 300° C.

4. The method according to claim 3 wherein said cooling liquid is selected from water, oil or molten salts.

5. The method according to claim 2 wherein said curved rods are pivotable about an axis passing through their two ends, a rotatably driven tubular sleeve is disposed about each of said curved rods, and each of said tubular sleeves is supported about a curved rod by graphite bearing rings further comprising:
   (a) maintaining the fluid at a temperature lower than that at which the graphite bearing rings oxidize.

6. The method according to claim 5 wherein said gas is selected from a reducing gas, an inert gas or a mixture of nitrogen and hydrogen.

7. The method according to claim 6 wherein said gas is substantially pure nitrogen.

8. The method according to claim 7 wherein said rate of flow of nitrogen through each rod is at a rate sufficiently high to substantially prohibit the graphite rings from oxidizing.

9. An improved method for bending of sheets of glass of the type which includes heating a glass sheet, advancing the heated glass sheet to a plurality of curved rods wherein said curved rods are pivotable about an axis passing through their two ends and a rotatably driven tubular sleeve is disposed about each of said curved rods, and each of said tubular sleeves is supported about a curved rod by graphite bearing rings, imparting a predetermined curvature to the glass sheet, and tempering the curved glass sheet, the improvement wherein:
   (a) the glass sheet is heated in an oven prior to imparting a curvature thereto to a first temperature slightly greater than the temperature necessary for commencing the tempering step;
   (b) generally maintaining the glass sheet at said first temperature until the tempering step is commenced;
   (c) a gas is injected into said rods; and
   (d) said gas is circulated within the annular space between each rod and the tubular sleeve disposed thereabout.

10. An improved glass bending apparatus of the type having a plurality of curved rods having a centrally arched portion each pivotable about an axis passing through its two ends to provide an envelope of a predetermined curvature for imparting a curvature to a sheet of heated glass being advanced thereof, a rotatable tubular sleeve disposed about each rod, a plurality of graphite bearing rings disposed at spaced locations between each rod and sleeve for supporting each of the rotatable tubular sleeves about one of the curved rods, the improvement comprising:

(a) means for injecting a fluid through the rods at a temperature substantially below the temperature of the heated glass, so that the graphite bearing rings are maintained in a substantially non-oxidizing environment.

11. The apparatus according to claim 10 wherein said means for fluid injection comprises:

(a) a bore through the rod for the circulation of a cooling fluid therethrough; and
(b) means for transmitting the cooling fluid to said bore.

12. The apparatus according to claim 11 wherein:

(a) said bore extends axially throughout said rod so that the cooling fluid is injected into the bore at one end of said rod and is exhausted at the other end.

13. The apparatus according to claim 11 wherein:

(a) said means for transmitting the cooling fluid to said bore is a pipe;
(b) the cross-sectional area of said pipe is less than the cross-sectional area of the bore of the rod;
(c) said pipe extends through one end of said bore to a distance substantially within said bore; and
(d) the other end of said rod is plugged so that liquid injected from the pipe into said bore exhausts from the bore in a direction generally opposite its entry direction through the annular region between the pipe and the inner surface of the rod.

14. The apparatus according to claim 10 wherein said means for fluid injection comprises:

(a) a bore through the rod for the circulation of said fluid;
(b) aperture means in said rod in communicating relation with said bore for permitting passage of the fluid from the bore into the annular region between the rod and the tubular sleeve disposed thereabout.

15. The apparatus according to claim 14 wherein:

(a) said fluid is selected from an inert gas, a reducing gas and a mixture of nitrogen and hydrogen.

16. The apparatus according to claim 15 wherein:

(a) said curved rod is made of stainless steel.

17. The apparatus according to claim 11 wherein said fluid injection means comprises:

(a) a bore through the rod for the circulation of a cooling fluid therethrough;
(b) means for transmitting the cooling fluid to said bore; and
(c) means for introducing a controlled flow of gas into the annular region between the rod and the tubular sleeve disposed thereabout.

18. The apparatus according to any of claims 10–17 further comprising:

(a) a thermally insulated chamber substantially enclosing at least the arched portion of said curved rods.

19. The apparatus according to claim 18 which further comprises:

20. An improved method for bending of sheets of glass of the type which includes heating a glass sheet, advancing the heated glass sheet to a plurality of curved rods, imparting a predetermined curvature to the glass sheet, and tempering the curved glass sheet, the improvement wherein:

(a) the glass sheet is heated in an oven prior to imparting a curvature thereto to a first temperature range slightly greater than the temperature necessary for commencing the tempering step;
(b) generally maintaining the glass sheet in said first temperature range while imparting said predetermined curvature thereto and until the tempering step is commenced; and
(c) maintaining said rods below a second temperature which is substantially lower than said first temperature.

* * * * *

UNITED STATES PATENT AND TRADEMARK OFFICE
CERTIFICATE OF CORRECTION

PATENT NO. : 4,236,907

DATED : December 2, 1980

INVENTOR(S) : Henri Mairlot

It is certified that error appears in the above—identified patent and that said Letters Patent is hereby corrected as shown below:

Column 8, line 27 (Claim 19), insert the following:

--a)  a heater disposed in said chamber.--

Signed and Sealed this

Seventh Day of April 1981

[SEAL]

Attest:

RENE D. TEGTMEYER

*Attesting Officer*    *Acting Commissioner of Patents and Trademarks*